United States Patent [19]

Coleman

[11] 3,769,517
[45] *Oct. 30, 1973

[54] CONTROLLED ATMOSPHERE CHAMBER
[75] Inventor: George E. Coleman, Elmhurst, Ill.
[73] Assignee: PPG Industries, Inc., Pittsburgh, Pa.
[*] Notice: The portion of the term of this patent subsequent to April 4, 1989 has been disclaimed.
[22] Filed: Jan. 21, 1972
[21] Appl. No.: 219,681

[52] U.S. Cl. ................................................ 250/455
[51] Int. Cl. ............................................ G01n 21/00
[58] Field of Search ...................... 250/43, 49.5 TE, 250/42, 44, 52, 50

[56] References Cited
UNITED STATES PATENTS
3,654,459  4/1972  Coleman ...................... 250/49.5 TE
2,683,689  7/1954  Nicholls ............................... 250/43
2,876,187  3/1959  Wolinski .............................. 250/42

Primary Examiner—James W. Lawrence
Assistant Examiner—B. C. Anderson
Attorney—Russell A. Eberly

[57] ABSTRACT

Apparatus which permits treatment of products with ultraviolet light in a controlled atmosphere comprises a chamber having inlet and outlet openings for the passage of a product to be treated, one or more ultraviolet light lamps, and at least one gas reservoir within the chamber separated by a foraminous panel. Gas is introduced into the reservoir, passes through the foraminous panel and over and around the path of travel of the workpiece to be treated.

8 Claims, 3 Drawing Figures

CONTROLLED ATMOSPHERE CHAMBER

BACKGROUND OF THE INVENTION

Processes in which materials are treated with ultraviolet light to effect polymerization, sterilization, etc. are known in the art and are becoming of increasing importance. The use of ultraviolet light for the curing of coatings is also of interest.

The use of ultraviolet light in treating various materials is carried out by exposing appropriately sensitive materials to light, at least part of which has a wavelength in the ultraviolet region. The ultraviolet region is usually considered to extend from about 4,000 A. down to as low as 40 A., although for practical purposes the region below about 2000 A. is not ordinarily significant. While sunlight includes wavelengths in the ultraviolet region, as received it has little or no light at wavelengths much below 3,000 A. due to absorption by the atmosphere. Thus, for useful processes it is necessary to use an ultraviolet lamp.

Several types of lamps are used to produce ultraviolet light. Mercury lamps, in which an electric discharge is passed through mercury vapor, are the most common, but others include metal halide lamps, luminescent or fluorescent lamps, etc. The so-called "Sunlamps" can also be employed.

It has been found that the efficiency of ultraviolet light in treating materials in many cases depends upon the environment of the material being treated. For example, many materials are more or less sensitive to ultraviolet, depending upon the atmosphere in which they are treated. The presence of certain levels of oxygen in the atmosphere is often a determining factor in both the rate of the desired reaction and the quality of the finished product. Other factors involve hazards such as the possibility of fire or explosion and the production of ozone during the treatment process.

It is therefore often desirable to carry out treatment with ultraviolet light in a controlled atmosphere in which the level of oxygen can be maintained within desired limits. While this is relatively easily carried out in a closed system, most processes cannot be economically performed in closed apparatus and heretofore it has not been possible to provide efficient control of the atmosphere surrounding a workpiece in a process wherein the products treated are continuously or intermittently moving.

One proposal for providing an inert atmosphere, suggested for use in a process involving electron beam irradiation, is described in U. S. Pat. No. 2,887,584. The apparatus as described therein comprises a chamber open at the bottom into which the product to be irradiated is passed while attempting to maintain a relatively inert atmosphere inside the chamber by use of a lighter-than-air inert gas to displace the air therein. The apparatus as described in the said patent is quite limited in the extent to which oxygen can be excluded from the path of the product to be irradiated, and for this reason does not appear to have been successfully utilized.

SUMMARY OF THE INVENTION

The apparatus of the present invention comprises a chamber having:

A. spaced outer walls with inlet and outlet openings establishing a path of travel for the workpiece to be treated;

B. at least one ultraviolet lamp positioned over at least a portion of the path of travel of the workpiece;

C. at least one foraminous panel within the chamber defining a reservoir between the panel and an outer wall of the chamber; and D. means for introducing gas into the reservoir.

The above-described apparatus provides for treating products with ultraviolet light in an atmosphere in which the level of oxygen or any other gaseous component can be controlled within quite rigid limits. For example, where it is desired to exclude oxygen to the extent possible, the present apparatus can easily attain oxygen levels in the path of travel of a workpiece as low as 100 parts per million or even lower, even where products are being continuously treated and thus are continuously moving through the apparatus.

DESCRIPTION OF THE DRAWINGS

In the drawings:

Referring to FIGS. 1 and 2, the substantially enclosed chamber 1 is formed by top portion 2, a bottom portion 3, and spacer 18, all mounted on a base 4, in which are installed the required instruments, valves, conveyor drive and electrical source (not shown). Attached to the underside of top 2 are two ultraviolet lamps 5 and 6, lamp 5 being a mercury lamp and lamp 6 being a metal halide lamp. Although only 2 lamps are shown, one or more may be used depending on the energy desired. The lamps are interchangeably connected to the electrical source through connectors 7 and 7'. Separating the lamps are reflectors 8, which are cooled by cooling lines 9 which pass through the reflectors and contain circulating water from water lines 10 and manifold 11. The top of the apparatus is fastened to the bottom 3 during operation by screw clamps 12. The bottom 3 has spaced inlet and outlet openings 13 and 13' at the end of extensions 14 and 14'. Through these openings passed conveyor 15. A gas manifold 16 is connected to a gas source (not shown) and this opens through the side wall of bottom 3. Top 2 is shown with a viewing window 17 which can be included if desired.

In FIG. 3, the relationship of top 2 and bottom 3 is shown, and there is also shown spacer 18 which can be placed between the top and bottom portions to vary the enclosed volume if desired. Inside bottom 3 are foraminous panels 19 and 19' forming reservoirs 20 and 20' into which gas is introduced through gas manifolds 16. The top 2 is partially cut away to show ultraviolet lamps 5 and 6 and reflectors 8, which are attached to the underside.

DESCRIPTION OF THE PREFERRED EMBODIMENTS

Figure 1:
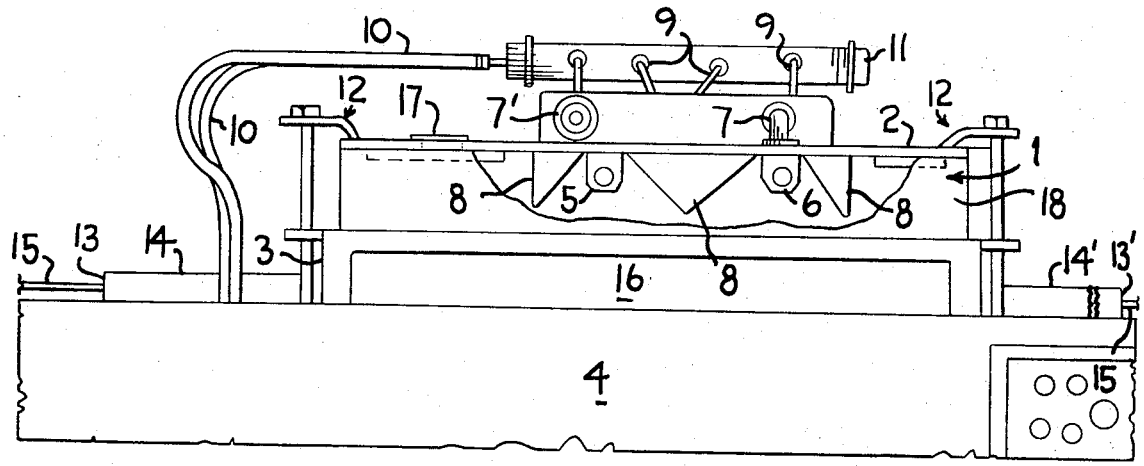
FIG. 1 is a front view of an apparatus comprising one embodiment of the invention, with a cutaway section showing the interior.
Figure 2:
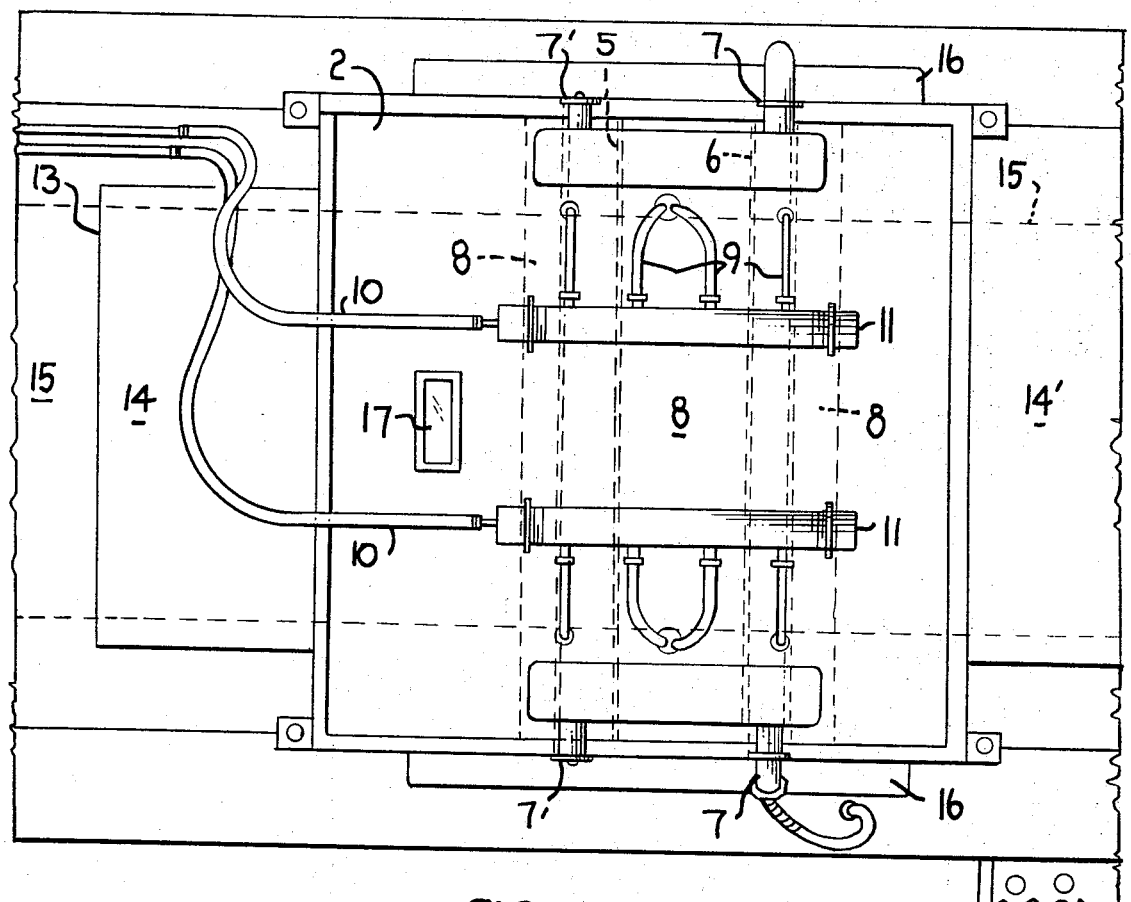
FIG. 2 is a top view of the apparatus of FIG. 1.
Figure 3:
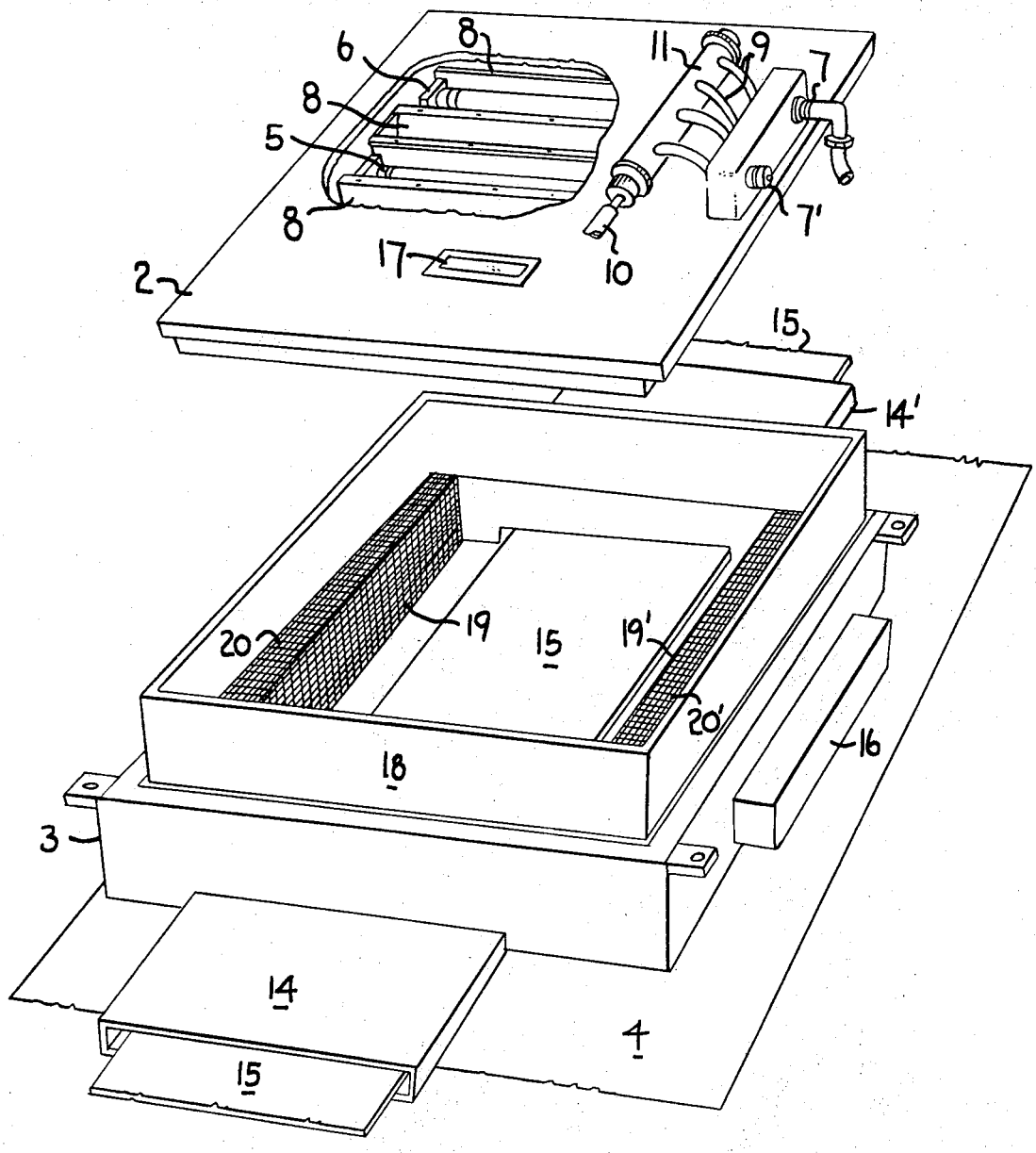
FIG. 3 is a perspective view showing the interior of the apparatus and the top and bottom portions, with a top portion cut away to show the lamps attached to the inside surface.

The apparatus can be of any suitable size or shape, depending upon the nature of the product or workpiece to be treated. It is ordinarily rectangular in shape with the ultraviolet lamps attached to the upper inside surface. The lamps employed can be any of the commercially available lamps which emit light in the ultraviolet region, preferably one which emits predominantly in the range of 2,000 A. to 3,000 A. Mercury vapor and metal halide vapor lamps are generally utilized. The distance from the lamp to the workpiece is not ordinarily critical within reasonable limits, and the optimum distance various with the intensity of the light, the nature and size of the material treated, the speed with which the workpiece is carried through the light zone, and similar factors. In the apparatus illustrated, the lamps are located about 1 to 16 inches from the conveyor.

It is not always necessary that the lamps be within the chamber in which the workpiece is treated. However, where the lamp is located outside the chamber, a suitable window made of a material which transmits ultraviolet light, such as quartz, should be used so as to permit the ultraviolet light to impinge on the desired portion of the path of travel of the product being treated.

Within the chamber are one or more foraminous panels defining a reservoir between an outer wall of the chamber and the panels. These panels can be of varying size and shape, although preferably rectangular to conform to the cross-section of the chamber. It is preferred that the foraminous panels be oppositely spaced and positioned on each side of the path of travel of the product. The holes in the panels should be distributed more or less uniformly over their surface and should be sufficient in size and number to provide a steady and relatively uniform diffusion of gas into the area of the product.

The volume of the reservoirs is relatively unimportant, except that each reservoir should be sufficient in volume so as to reduce turbulence from the introduction of gas and to provide a cushioning effect to any gas flow from the gas inlet. The optimum volume of the reservoirs thus depends upon the number and type of gas inlets, the flow rate of gas, and the overall dimensions of the components of the apparatus. In normal operation each reservoir acts as a plenum and is at a higher pressure than the interior of the chamber, thereby maintaining relatively uniform flow through each of the holes in the foraminous panels.

The chamber has openings establishing the path of travel for the product. Ordinarily, these openings are in oppositely spaced outer walls of the chamber and the path of travel passes through the chamber, between the foraminous panels, and beneath the window and the path of the radiation. The cross-sectional area of these inlet and outlet openings should be as low as possible to permit the passage of the product, and the larger the area of the inlet and outlet, the longer the path of travel through the chamber should be. The object is to provide a stable condition inside the chamber, thereby minimizing differences due to external changes in atmosphere, such as caused by air movements.

It is desirable to provide outwardly extending sections from the outer walls of the chamber and to locate the inlet and outlet openings in these extended sections. The extensions are generally of substantially the same cross-section as the openings and should extend outwardly for a length sufficient to provide laminar flow of the exit gases from the chamber. The size and shape of the inlet and outlet openings, and the outwardly extending sections, can be made to conform to the size and shape of various workpieces. Replaceable or movable sections having different configurations can be provided if desired.

The apparatus also comprises means for the introduction of gas into the reservoir or reservoirs. In order to assist in providing a non-turbulent atmosphere, this is usually accomplished by providing a gas inlet into a manifold, from which the gas passes into the reservoir through a plurality of openings. The gas inlets are usually spaced so as to avoid direct flow from them into the openings.

As indicated, the overall size of the apparatus can be varied, although it can be noted that the overall distance the light must travel before meeting the surface of the workpiece affects to some extent the distribution of energy in the product treated. The apparatus can be constructed of any material which is not overly sensitive to ultraviolet light, i.e., which does not substantially degrade and become unusable when subjected to such light over a period of time. Most metals, glass, plastics, etc., can be used. It is preferred that a noncorrosive material be utilized and stainless steel is the specifically preferred material of construction.

The apparatus can also be provided with certain optional components. Reflectors, preferably cooled, can be provided for the lamps. Means for conveying the product along the path of travel can be included, for example, rollers located in the lower portion of the chamber; these can be power-driven if desired.

Other auxiliary equipment which is often desirable include means for introducing gas at the inlet and outlet; these can be gas distribution tubes extending along the opening and having a plurality of inlet holes spaced along their length with the gas flow directed downward, preferably at a 45° angle. Still other optional features include provision for continuously or periodically analyzing the atmosphere inside the chamber, means for viewing the interior of the chamber and the product, such as a transparent window, vacuum or other pumps, and the like.

The apparatus can be varied in structure to meet the needs of specific processes in which it is employed. For example, the apparatus can be used with more than one source of ultraviolet light by providing a plurality of lamps as required. Both sides of a workpiece can be exposed, if desired, or a workpiece of complex shape can be treated from various angles.

In one embodiment of the invention, an apparatus as shown in the drawings comprises a chamber 18 inches long and 18 inches wide, with the depth varying from 3 inches to 18 inches. Attached to the top inner surface are two ultraviolet lamps, each 12 inches long, one a Sylvania mercury vapor lamp rated at 330 watts/inch and the other a Sylvania metal halide seeded mercury vapor lamp rated at 330 watts/inch. The lamps are arranged so that either or both can be used at any one time. Covering each lamp is a polished steel reflector, each reflector having therein a coil through which cooling water is circulated when the lamps are in operation. The lamps are spaced from ⅞ inch to 16 inches from the conveyor which passes beneath the lamps and through the chamber, depending upon the spacer employed. Two foraminous panels having 1/16 inch holes uniformly spaced one-sixteenth inch apart over their entire surface extend along the length of the chamber, one on each side, spaced three-fourths inch from the outer wall, and rising 2¼ inches from the bottom. Each of the inlet and outlet openings in the chamber is 14 inches wide by 1 inch high, and each is located in a section of the chamber extending outwardly 22 inches from opposite chamber walls. A manifold having 6 openings each three-fourths inch in diameter opens into each of the reservoirs behind the foraminous panels, each manifold being connected to a source of nitrogen gas.

The apparatus as described is constructed of stainless steel and can accommodate products up to about 12 inches wide and about seven-eighths inch thick. The apparatus can, of course, be made of any size desired, for example, to accommodate panels of 4 or 5 feet in width.

In one example of the manner in which the above-described apparatus is operated, a total nitrogen flow of 40 cubic feet per minute is passed into the manifold, distributed into the reservoirs, and passed through the foraminous panels into the path of travel of the workpiece. A product line 12 inches wide is carried through the chamber at a rate of 50 feet per minute. During such operation, the concentration of oxygen in the path of travel of the product is less than 50 parts per million. If the product line is carried through the chamber at 300 feet per minute, the oxygen content is still maintained below 125 parts per million.

The apparatus can also be used to provide a sustained level of oxygen (or other gas) during operation. This is desirable using some coating materials, for example, and is accomplished by feeding a controlled mixture of oxygen and nitrogen through the gas distribution system. An advantage of the use of the apparatus in this manner is that ozone and other gaseous by-products are removed during operation and thus the concentration of such by-products does not build up to undesirably high levels. The apparatus can also be operated at reduced pressure, by providing suitable auxiliary equipment, e.g., pumps, chambers, etc.

According to the provisions of the patent statutes, there are described above the invention and what are now considered to be its best embodiments. However, within the scope of the appended claims, it is to be understood that the invention can be practiced otherwise than as specifically described.

I claim:

1. Apparatus for treating products with ultraviolet light in a controlled atmosphere, said apparatus comprising a substantially enclosed chamber having
   A. spaced outer walls with spaced inlet and outlet openings establishing a path of travel for a workpiece,
   B. at least one ultraviolet lamp positioned over at least a portion of said path of travel;
   C. at least one foraminous panel within said chamber defining a reservoir between the panel and an outer wall of the chamber; and
   D. means for introducing gas into said reservoir.

2. The apparatus of claim 1 in which said inlet and outlet openings are located in outwardly extending sections of said outer walls.

3. The apparatus of claim 1 in which said foraminous panel has substantially uniform openings spaced over its entire surface.

4. The apparatus of claim 1 in which said means for introducing gas comprises a plurality of gas inlet openings into said reservoir.

5. Apparatus for treating products with ultraviolet light in a controlled atmosphere, said apparatus comprising a substantially enclosed chamber having
   A. oppositely spaced outer walls with spaced inlet and outlet openings establishing a path of travel for a workpiece;
   B. at least one ultraviolet lamp positioned over at least a portion of said path of travel;
   C. oppositely spaced foraminous panels along each side of said path of travel, each of said panels defining a reservoir between the panel and an outer wall of the chamber; and
   D. means for introducing gas into said reservoirs.

6. The apparatus of claim 5 in which said inlet and outlet openings are located in outwardly extending sections of said outer walls.

7. The apparatus of claim 5 in which said foraminous panels have substantially uniform openings spaced over their entire surfaces.

8. The apparatus of claim 5 in which said means for introducing gas comprises a plurality of gas inlet openings into each of said reservoirs.

* * * * *